Figure 1:
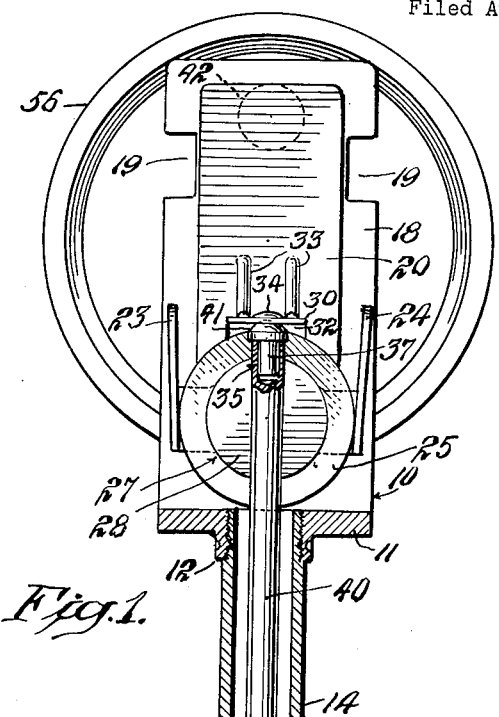

July 17, 1962

J. REINGRUBER 3,045,085

PROBE TYPE THERMOSTAT

Filed Aug. 28, 1958

INVENTOR.
JOSEPH REINGRUBER

BY E. M. Squire

ATTORNEY

United States Patent Office 3,045,085
Patented July 17, 1962

3,045,085
PROBE TYPE THERMOSTAT
Joseph Reingruber, Cairo, N.Y., assignor to American Thermostat Corporation, South Cairo, N.Y., a corporation of New York
Filed Aug. 28, 1958, Ser. No. 757,780
4 Claims. (Cl. 200—137)

The present invention relates to an adjustable thermostatic switch and more particularly to a switch of this character which is of the probe type permitting it to be inserted in a complementary recess provided for this purpose in electrically energized heating or cooking apparatus.

An object of the invention is the provision of a switch of this character which is easily adjusted in the course of its initial temperature calibration and which will maintain this initial calibration adjustment indefinitely notwithstanding repeated temperature changes throughout a wide range of temperatures.

Another object of the invention is the provision of a thermostatic switch wherein there is a temperature reference member in the form of a rod formed of material having a low temperature coefficient of expansion, the rod being supported only at its ends, the ends being held in appropriately shaped indentations by the yielding application of compressive force to the ends of the rod.

Still another object of the invention is the provision of a post-calibration adjustment screw for manipulation by a user of the device which is interiorly threaded throughout its entire length so that it may receive both a calibration adjustment screw and a mounting screw for securing a calibrated temperature adjustment knob, the knob being adjusted at will by the user to set a predetermined desired temperature of operation for the electrical heating apparatus with which the thermostat is used.

Briefly, the invention comprises an elongated tube which is closed at one end and open at the other end. At its open end, the tube is exteriorly threaded, the threads being received in an interiorly threaded sleeve or collar which is integrally formed with the frame of the thermostat. Prior to initial calibration during manufacture, the position of the tube relative to the frame may be adjusted by turning the tube. Once the correct longitudinal position of the tube has been ascertained, indentations are formed in the sleeve by a press operation or other suitable method so that the threads are deformed and the position of the tube relative to the frame is permanently locked and will be maintained notwithstanding repeated temperature changes. Disposed within the tube is a temperature insensitive rod which carries a ceramic insulating button at one end. The button is received in an indentation formed in a projection of a contact spring of the switch which yieldingly applies pressure to the button. The other end of the rod rests in a conical indentation inside the free end of the tube, the ends of the rod being held centered in the two indentations by the pressure applied to the button.

The adjustment screw for setting the temperature of operation comprises an externally threaded adjustment member having a stop projection formed thereon and which is interiorly threaded throughout its entire length. A second ceramic insulating button is associated with the adjustment member and its position is separately adjustable by means of a calibration screw disposed within the adjustment member. The button is held pressed against the calibration screw by pressure applied thereto by the other contact spring. At its free end, the adjustment member is provided with reference key slots for cooperation with a standardized calibrated adjustment knob. During initial calibration, the key slots are used for reference purposes, thus permitting any standard knob to be used with any previously calibrated thermostat.

Additional objects, features and advantages of the invention will become apparent upon reading the following specification in conjunction with the accompanying drawing which forms a part hereof.

Figure 2:
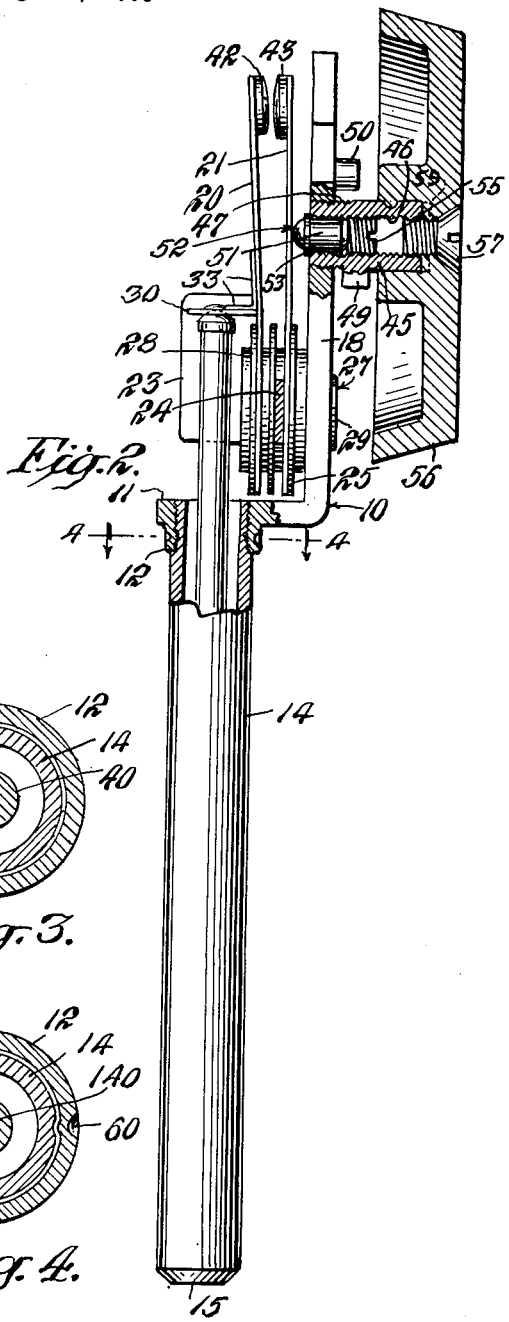
Figure 3:
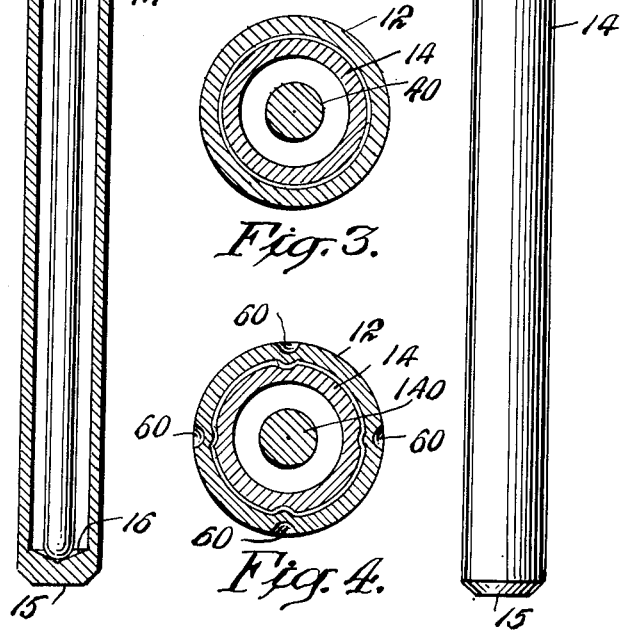
Figure 4:
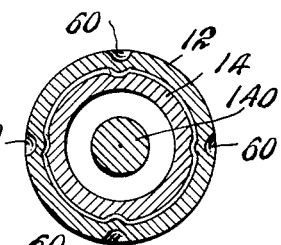

Referring to the drawing:
FIGURE 1 is a rear view of a thermostatic switch embodying the invention, the probe tube being shown in axial section.
FIGURE 2 is a side view of the switch shown in FIG. 1, the connection between the probe tube and the frame being shown in section.
FIGURE 3 is a transverse sectional view showing the threaded connection between the probe tube and the frame but prior to deformation of the threads after calibration.
FIGURE 4 is a view similar to FIG. 3 showing the threads of FIG. 3 in their deformed condition after calibration, the view of FIG. 4 being taken along the line 4—4 of FIG. 2 looking in the direction of the arrows.

Referring to FIG. 1, the switch comprises an integral L-shaped metallic frame designated generally as 10. The shorter leg 11 of the frame 10 is provided with an integrally formed sleeve or collar 12 which may advantageously be obtained by means of a piercing and drawing operation performed in a suitable press. The collar 12 is interiorly threaded throughout its entire length. The upper end of a hollow tubular thermal expansion member 14 is disposed in threaded engagement with the collar 12. The inner surface of the closed end 15 of the tubular expansion member 14 is provided with a conically shaped recess 16. The tubular expansion member 14 forms a probe which is adapted to be inserted in a cylindrical recess provided for this purpose in the electrically heated apparatus (not shown) which is to be controlled by the thermostatic switch. The expansion member or probe 14 is formed of aluminum or other suitable material having a high temperature coefficient of expansion.

The vertical or longer leg 18 of the frame 10 has two rectangular lateral notches formed therein on opposite sides thereof which are arranged for engagement with cooperating positioning projections of an insulating housing (not shown) in which the switch is usually mounted for actual use.

Two flexible elongated contact springs 20 and 21 are mounted on the longer leg 18 of the frame 10. An electrical terminal in the form of a bracket or lug 23 is held pressed against the contact spring 20 and a similar terminal lug 24 is held pressed against the other contact spring 21, the springs 20 and 21 and terminal lugs 23 and 24 being assembled in a spring pileup comprising mica insulating washers 25. The spring pileup is held together and is secured as a unit to the longer leg 18 of the frame 10 by a hollow rivet designated generally as 27 which comprises an enlarged disc-shaped head 28 and an end portion 29 which is headed over, as shown. The rivet 27 thus holds the spring pileup which is made up of the flexible contact springs 20 and 21, the terminal lugs 23 and 24 and the insulating washers 25 permanently and fixedly mounted on the frame 10 of the switch.

The contact spring 20 has a tongue 30 which extends outwardly therefrom. The tongue 30 is punched out of the body of the spring 20 leaving a rectangular hole 32. The hole 32 increases the flexibility of spring 20 in the portion adjacent to that which is secured under pressure in the pileup by the rivet 27. Elongated spaced parallel indentations providing stiffening ribs 33 are formed in the body of the spring 20 and extend along the tongue 30. These ribs 33 resist bending of the tongue 30 with respect to the spring 20.

A rounded indentation 34 is formed centrally in the tongue 30. A button 35 of heat resistant electrical insulating material such as a ceramic has its shank 37 disposed in a cylindrical recess formed in the upper end of a rod 40. The rod 40 is formed of a metal alloy having an extremely low temperature coefficient of expansion. While the temperature coefficient of the rod 40 is not required to be as low as that of invar, it is much lower than that of the probe tube 14. The head 41 of button 35 is received in the concavity formed in the under side of tongue 30 by the indentation 34. The lower end of rod 40 is rounded and is received in the conically shaped recess 16 in the lower end of tubular probe member 14.

The spring 20 is tensioned to apply a yielding longitudinal compressive force to the rod 40 so that it is held centered coaxially with the tubular probe 14. The spring 20, at its free end, carries an electrical contact 42. The spring 21 similarly carries a contact 43 which co-operates with the contact 42 of spring 20. The contacts 42 and 43 engage and disengage each other in response to temperature variations as described in greater detail below. The contacts 42 and 43 are serially included in a heater switching circuit which extends between the terminal lugs 23 and 24. The terminal lugs 23 and 24 are adapted for engagement by contact springs (not shown) mounted in the insulating housing, referred to above.

A tubular temperature adjustment member 45 is interiorly threaded at 46 and exteriorly threaded at 48. The external threads 46 of adjustment member 45 are threadedly engaged in the longer leg 18 of the frame 10. The adjustment member 45 carries a radially outwardly extending projection 49 which is engageable with a fixed stud 50 mounted on the longer leg 18 of the frame 10. The projection 49 and stud 50 cooperate to limit the maximum rotation of the adjustment member 45 to somewhat less than one complete revolution.

The internal threads 46 in adjustment member 45 extend throughout the entire length of the adjustment member. The shank 51 of a button 52 is slidably disposed in the internal threads 46. The button 52 is formed of heat resistant electrically insulative material, like the button 35. The head 53 of button 52 is in engagement with the spring 21 and the spring 21 is tensioned to press the button 52 toward the right as viewed in FIG. 2 so that it is held in the temperature adjustment member 45. The position of button 52 may be varied axially within the temperature adjustment member 45 by a calibration screw 55 in threaded engagement with the internal threads 46.

A temperature adjustment knob 56 having a calibrated scale, which is not visible in the drawing, is mounted on the outer end of the temperature adjustment member 45 by means of a flat head machine screw 57. The mounting screw 57 is in threaded engagement with the internal threads 46 along with the calibration screw 55. Access to the calibration screw 55 is thus prevented with the adjustment knob 56 in place. The knob 56 is provided with integrally formed projections 58 which extend into key slots 59 formed in the outer end of temperature adjustment member 45. The projections 58 and the key slots 59 in which they are received, are disposed at diametrically opposite sides of the internal threads 46.

During initial calibration, the key slots 59 are brought to a predetermined position with reference to the standardized calibrated temperature scale of the adjustment knob 56 with the adjustment knob removed. The calibration screw 55 is also brought to a predetermined standardized position. With the probe member 14 at a known calibration temperature, the probe member 14 is rotated so that its longitudinal position with respect to the frame 10 is varied under conditions of constant temperature. When contacts 42 and 43 just touch each other a critical calibration position has been ascertained. This position of adjustment of probe 14 is then permanently locked by pressing indentations 60 (FIG. 4) in the sleeve or collar portion 12 of frame 10. The indentations 60 deform the threads and permanently lock this calibration adjustment notwithstanding repeated changes in the temperature of the probe member 14 relative to the sleeve or collar 12. Thereafter, minor adjustments may be made by means of the calibration screw 55.

In operation, when the temperature rises, the probe 14 will expand longitudinally and lower the position of the conical recess 16. This, in turn, lowers the lower end of the relatively non-expansible metallic rod 40 so that the position of the button 35 at its upper end is also lowered. Tongue 30 then moves downwardly and spring 20 moves toward the left. This permits contact 42 to disengage contact 43. In the usual heating circuit, this will deenergize the heater thereby initiating a temperature drop which will cause contacts 42 and 43 to re-engage each other. The temperature at which contacts 42 and 43 engage and disengage may be varied by turning the control knob 56.

While I have shown what I believe to be the best embodiments of my invention, it will be apparent to those skilled in the art that various changes and modifications may be made without departing from the spirit and scope of the invention as defined in the appended claims.

What is claimed is:

1. A probe thermostat comprising, in combination: a hollow metallic tubular probe member closed at one end and exteriorly threaded at the other end, said probe member being open at said other end; a metallic frame member including an integrally formed interiorly threaded sleeve portion in which said other end of said probe member is threadedly engaged, said probe member being formed of material having a high thermal coefficient of expansion, said sleeve portion having external indentations formed therein which deform the threads of said probe member positively and permanently preventing relative rotational movement between said probe member and said sleeve portion, whereby said sleeve portion and said probe member are permanently locked together notwithstanding repeated changes in the temperature of said probe member relative to said sleeve portion; a rod member extending longitudinally of said probe member coaxially therewith, said rod member being formed of a material having a temperature coefficient of expansion which is materially lower than that of said probe member, one end portion of said rod member extending beyond said open end of said probe member, and adjustable electric switch mechanism fixedly mounted on said frame member, said switch mechanism engaging said one end of said rod member for actuation by displacement thereof, said contact mechanism including means yieldingly pressing on said one end of said rod member for holding the other end of said rod member in engagement with the closed end of said probe member.

2. A probe thermostat according to claim 1, wherein said closed end of said probe member is conically shaped at its inner surface and in which said rod member has a rounded end which yieldingly presses against said conical surface, whereby said rounded end is maintained centered with respect to said closed end of said probe member.

3. A probe thermostat according to claim 1, wherein said switch mechanism includes a rounded button of electrical insulating material, said button having a shank portion ensleeved in said one end of said rod member, said button having a rounded outer surface which engages in a cooperating recess formed in a portion of said switch mechanism which is responsive to displacements of said one end of said rod member.

4. In a probe type thermostat comprising a metallic frame member; electrical switch means carried by said frame member; an elongated hollow tubular probe member having a predetermined high temperature coefficient of expansion; a rod member coaxially disposed within said probe member and having a temperature coefficient of expansion which is materially less than that of said probe member, said probe member having an end wall portion which is engaged by one end of said rod member, the other end of said rod member extending beyond said probe member and engaging said switch means for actuating said switch means in response to temperature changes of said probe member, the improvement which comprises the provision of an integrally formed sleeve portion of said frame member which is interiorly threaded, said probe member having an exteriorly threaded end portion remote from said end wall, said exteriorly threaded portion of said probe member being in threaded engagement with said sleeve portion, said sleeve portion having indentations formed therein which deform the interengaging threads of said probe member and said sleeve portion, whereby said probe member is permanently locked to said sleeve portion notwithstanding repeated changes in the temperature of said probe member relative to said sleeve portion.

References Cited in the file of this patent

UNITED STATES PATENTS

| | | |
|---|---|---|
| 2,113,494 | Richmond | Apr. 5, 1938 |
| 2,270,738 | Lightfoot | Jan. 20, 1942 |
| 2,549,740 | Yonkers | Apr. 17, 1951 |
| 2,559,372 | Rike | July 3, 1951 |
| 2,705,745 | Matthysse | Apr. 5, 1955 |
| 2,768,263 | Callihan | Oct. 23, 1956 |
| 2,817,732 | Reingruber | Dec. 24, 1957 |
| 2,830,166 | Loomis | Apr. 8, 1958 |
| 2,856,489 | Bletz | Oct. 14, 1958 |

FOREIGN PATENTS

| | | |
|---|---|---|
| 789,860 | Great Britain | Jan. 29, 1958 |